United States Patent
Otonari et al.

(10) Patent No.: US 9,179,422 B2
(45) Date of Patent: Nov. 3, 2015

(54) WIRELESS BASE STATION APPARATUS AND COMMUNICATION METHOD

(71) Applicant: FUJITSU LIMITED, Kawasaki (JP)

(72) Inventors: Junji Otonari, Kawasaki (JP); Dai Kimura, Yokohama (JP); Michiko Anbe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/640,660

(22) Filed: Mar. 6, 2015

(65) Prior Publication Data

US 2015/0181538 A1 Jun. 25, 2015

Related U.S. Application Data

(63) Continuation of application No. PCT/JP2012/073513, filed on Sep. 13, 2012.

(51) Int. Cl.
*H04B 7/00* (2006.01)
*H04W 52/24* (2009.01)
(Continued)

(52) U.S. Cl.
CPC ........... *H04W 52/244* (2013.01); *H04J 11/003* (2013.01); *H04J 11/005* (2013.01); *H04W 52/367* (2013.01); *H04J 2011/0096* (2013.01); *H04W 52/16* (2013.01); *H04W 52/283* (2013.01)

(58) Field of Classification Search
CPC . H04W 52/16; H04W 52/367; H04W 52/283; H04W 52/143
USPC .......... 455/522, 68, 69, 500, 517, 67.11, 507, 455/561, 562.1, 550.1, 509, 450, 514, 524, 455/525, 426.1, 426.2, 423–425, 436–444, 455/445, 127.1, 515; 370/310, 328, 329, 370/338, 343
See application file for complete search history.

(56) References Cited

U.S. PATENT DOCUMENTS

2003/0104784 A1* 6/2003 Foschini et al. .................. 455/63
2010/0091724 A1 4/2010 Ishii et al.
(Continued)

FOREIGN PATENT DOCUMENTS

JP 2010-034756 A 2/2010
JP 2011-146804 A 7/2011
(Continued)

OTHER PUBLICATIONS

3GPP TS 36.213 V9.3.0, "3rd Generation Partnership Project; Technical Specification Group Radio Access Network; Evolved Universal Terrestrial Radio Access (E-UTRA); Physical layer procedures (Release 9)", Sep. 2010.
(Continued)

*Primary Examiner* — Keith Ferguson
(74) *Attorney, Agent, or Firm* — Myers Wolin, LLC

(57) ABSTRACT

A wireless base station apparatus to establish a wireless connection with a terminal equipment detects an intensity of a signal transmitted from another terminal equipment; calculates, as transmission power for the terminal equipment, a sum of a first parameter adjusted at an interval of predetermined time and a second parameter taking a value between a predetermined first minimum value and a predetermined first maximum value; sets, as the second parameter, the larger value of a difference between first target power and the first parameter and the first minimum value when detecting that reception power of the signal transmitted from another terminal equipment is equal to or larger than a predetermined value, and further sets a difference between the first target power and the first minimum value as the first parameter and the first minimum value as the second parameter when the first parameter is adjusted.

5 Claims, 9 Drawing Sheets

(51) Int. Cl.
*H04W 52/36* (2009.01)
*H04J 11/00* (2006.01)
*H04W 52/16* (2009.01)
*H04W 52/28* (2009.01)

(56) References Cited

U.S. PATENT DOCUMENTS

| | | |
|---|---|---|
| 2011/0003559 A1 | 1/2011 | Morita et al. |
| 2011/0310758 A1 | 12/2011 | Tamaki et al. |
| 2012/0252469 A1* | 10/2012 | Okino .................... 455/449 |
| 2012/0282889 A1 | 11/2012 | Tanaka et al. |
| 2013/0005388 A1 | 1/2013 | Naka et al. |
| 2014/0323124 A1 | 10/2014 | Tanaka et al. |

FOREIGN PATENT DOCUMENTS

| | | |
|---|---|---|
| JP | 2011-166223 A | 8/2011 |
| JP | 2012-004924 A | 1/2012 |
| WO | 2008/105316 A1 | 9/2008 |
| WO | 2009/122778 A1 | 10/2009 |
| WO | 2011/118212 A1 | 9/2011 |

OTHER PUBLICATIONS

3GPP TS 36.331 V9.9.0, "3rd Generation Partnership Project; Technical Specification Group Radio Access Network; Evolved Universal Terrestrial Radio Access (E-UTRA); Radio Resource Control (RRC); Protocol specification (Release 9)", Dec. 2011.
International Search Report issued for corresponding International Patent Application No. PCT/JP2012/073513, mailed Dec. 4, 2012.
Extended European search report with the supplementary European search report and the European search opinion issued for corresponding European Patent Application No. 12884557.5 dated Aug. 7, 2015.
Mediatek Inc, "Specification Impacts of eICIC in Macro-Femto Deployment", Agenda Item: 6.8.2, 3GPP TSG-RAN WG1 #62bis, R1-105239, 3rd Generation Partnership Project (3GPP), Xi'An, China, Oct. 11-15, 2010.

* cited by examiner

FIG.8

| WHEN NUMBER OF VictimUEs WITHIN FEMTO CELL INCREASES | Δoffset1 = +3dB<br>DATA CHANNEL POWER ADJUSTMENT RANGE: +3dB ... -6dB |
| --- | --- |
| WHEN NUMBER OF VictimUEs WITHIN FEMTO CELL DOES NOT VARY | Δoffset1 = +6dB<br>DATA CHANNEL POWER ADJUSTMENT RANGE: +6dB ... -3dB |
| WHEN NUMBER OF VictimUEs WITHIN FEMTO CELL DECREASES | Δoffset1 = +9dB<br>DATA CHANNEL POWER ADJUSTMENT RANGE: +9dB ... 0dB |

FIG.9

| | |
|---|---|
| WHEN NUMBER OF INTERFERING UEs IN PERIPHERY OF FEMTO CELL DECREASES | $\Delta \text{offset2} = +3\text{dB}$<br>DATA CHANNEL POWER ADJUSTMENT RANGE: +6dB ... -3dB |
| WHEN NUMBER OF INTERFERING UEs IN PERIPHERY OF FEMTO CELL DOES NOT VARY | $\Delta \text{offset2} = +6\text{dB}$<br>DATA CHANNEL POWER ADJUSTMENT RANGE: +3dB ... -6dB |
| WHEN NUMBER OF INTERFERING UEs IN PERIPHERY OF FEMTO CELL INCREASES | $\Delta \text{offset2} = +9\text{dB}$<br>DATA CHANNEL POWER ADJUSTMENT RANGE: 0dB ... -9dB |

WIRELESS BASE STATION APPARATUS AND COMMUNICATION METHOD

CROSS-REFERENCE TO RELATED APPLICATION

This application is a continuation application of International Application PCT/JP2012/073513 filed on Sep. 13, 2012, the entire contents of which are incorporated herein by reference.

FIELD

The embodiments discussed herein are related to a wireless base station apparatus and a communication method.

BACKGROUND

A multiplicity of wireless base stations is installed to enable communications to be performed anywhere in a wireless communication network for mobile phone services etc. The wireless base stations are classified into: an outdoor base station installed on a roof floor of a building or at a steel tower to cover a communication area (macro cell) spreading several kilometers in radius; and a micro base station installed in a small-sized shop or a general house to cover a communication area (femto cell) spreading several tens of meters in radius.

The outdoor base station is also called a macro base station and a macro cell base station. The micro base station is also called a femto base station, a femto cell base station, femto and a femto cell.

Over the recent years, a wireless communication system such as a mobile communication network has broadly examined an improvement of a quality of indoor mobile phone services and an expansion of a service area by setting up the femto base station in an indoor space of a general home or an office.

The wireless base station in the existing mobile communication network including the femto base station transmits a common pilot signal to a mobile station. The mobile station receives this common pilot signal, thereby establishing synchronization with the wireless base station and performing channel estimation. The mobile station attains data transmission and data reception with respect to the wireless base station connected to the self-device.

FIG. 1 is a diagram illustrating an example of common pilot channel power and data channel power of a downlink transmission channel. Herein, in a LTE (Long Term Evolution) system based on 3GPP (Third Generation Partnership Project) Standards, the data channel power of the downlink transmission channel is, as illustrated in FIG. 1, defined by the common pilot channel power and a power offset with respect to the common pilot channel power.

To be specific, in the LTE system, the data channel (PDSCH (Physical Downlink Shared Channel)) power of the downlink transmission channel is determined as a total value of transmission power of a Reference Signal (RS Power) corresponding to the common pilot signal and a power offset (p-a) with respect to the transmission power. Therefore, a change of the transmission power of the PDSCH is actually attained by adjusting a set value of the "RS Power" and a set value of the "p-a".

The downlink transmission channel is defined as a transmission channel in a direction from the wireless base station toward the mobile station.

PATENT DOCUMENT

[Patent document 1] Japanese Laid-Open Patent Publication No. 2011-166223
[Patent document 2] Japanese Laid-Open Patent Publication No. 2010-34756
[Patent document 3] International Publication Pamphlet No. WO 2009/122778
[Patent document 4] Japanese Laid-Open Patent Publication No. 2011-146804

NON-PATENT DOCUMENT

[Non-Patent document 1] 3GPP TS36.213 v9.3.0
[Non-Patent document 2] 3GPP TS36.331 v9.9.0

SUMMARY

The configuration of the disclosure adopts the following means in order to solve the problems described above.

Namely, a first aspect is to be a wireless base station apparatus to establish a wireless connection with terminal equipment, including:
a detection unit configured to detect an intensity of a signal transmitted from another terminal equipment other than the terminal equipment; and
a power calculation unit configured to calculate, as transmission power for the terminal equipment, a sum of a first parameter adjusted at an interval of predetermined time and a second parameter taking a value between a predetermined first minimum value and a predetermined first maximum value,
wherein the power calculation unit is configured to set, as the second parameter, the larger value of a difference between first target power and the first parameter and the first minimum value when detecting that reception power of the signal transmitted from another terminal equipment is equal to or larger than a predetermined value, and further set a difference between the first target power and the first minimum value as the first parameter and the first minimum value as the second parameter when the first parameter is adjusted.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 8 is a table representing an example of how "Δoffset1" is determined; and

FIG. 9 is a table representing an example of how "Δoffset2" is determined.

DESCRIPTION OF EMBODIMENTS

An adjustment range of the "RS Power" in the LTE system extends from, e.g., "−60 dBm" to "+50 dBm". When changing the "RS Power", the wireless base station notifies the mobile station of the set value of the "RS Power" as system information (SIB: System Information Block) from the wireless base station. A period of update time of the set value of the "RS Power" spans several hundreds of milliseconds through several minutes. The set value of the "RS Power" is contained in the system information given from the wireless base station, and it is therefore difficult to change the set value of the "RS Power" on an arbitrary timing.

By contrast, an adjustment range of the power offset "p-a" extends from, e.g., "−6 dB" to "+3 dB". The base station delivers a change instruction of the power offset to the mobile station. A period of time (update time of the power offset "p-a") for completing an acknowledgment of the change instruction of the power offset, spans several milliseconds through several seconds. The adjustment range of the power offset is smaller than the adjustment range of the "RS Power", however, the time for changing the power offset is shorter than the time for changing the "RS Power". The set value of the "p-a" is changed upon completing the acknowledgment of the change instruction of the "p-a", and hence it is easy to change the set value of the "p-a" on an arbitrary timing.

Figure 1:
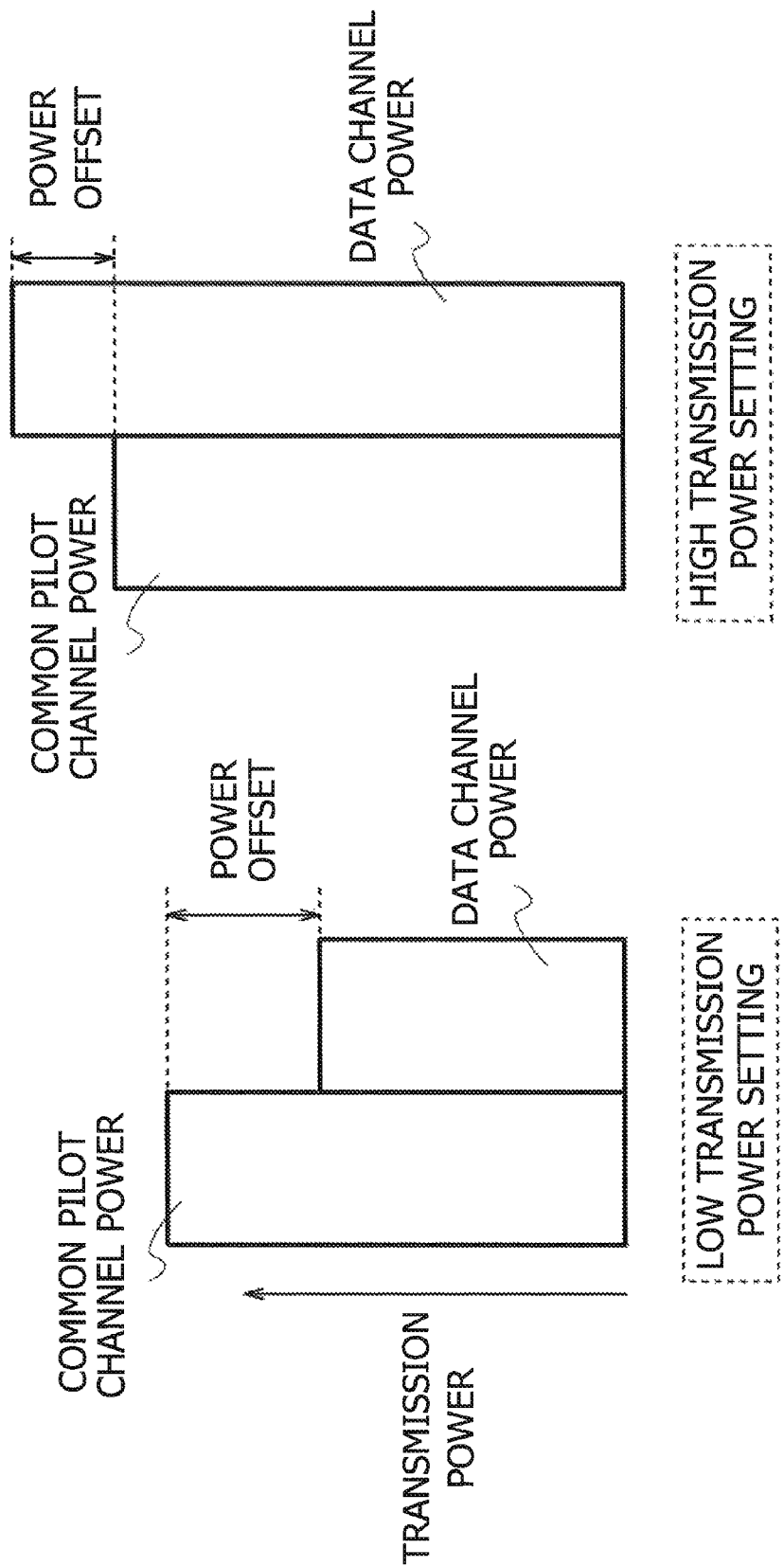
FIG. 1 is a diagram illustrating an example of common pilot channel power and data channel power of a downlink channel.

Accordingly, with respect to the PDSCH, when switching over high transmission power setting and low transmission power setting of the data channel power as in FIG. 1, the adjustment of the "RS Power" has a difficulty to change the transmission power in the way of following the change of the transmission power. On the other hand, the adjustment of the power offset enables a quicker change than the adjustment of the "RS Power", but is narrow in range of the adjustment. Therefore, such a case occurs as to wait for the adjustment of the "RS Power" when changing the transmission power; such a period occurs as to degrade a communication quality due to the low transmission power of the PDSCH; and also such a period occurs as to interfere with other cells due to the high transmission power of the PDSCH.

Herein, a description of how the downlink transmission power of the femto cell being adjacent to or overlapped with the macro cell area is set, will be made by way of an example of switching over the high transmission power setting and the low transmission power setting of the PDSCH transmission power.

A femto base station (HeNB: Home eNodeB) configures the femto cell area within the macro cell area configured by a macro base station (MeNB: Macro eNodeB). Herein, an assumption is that the HeNB configures a Closed Access femto cell area to which connections with mobile stations of subscription users are established but not connections of the mobile stations of users other than the subscription users.

Figure 2:
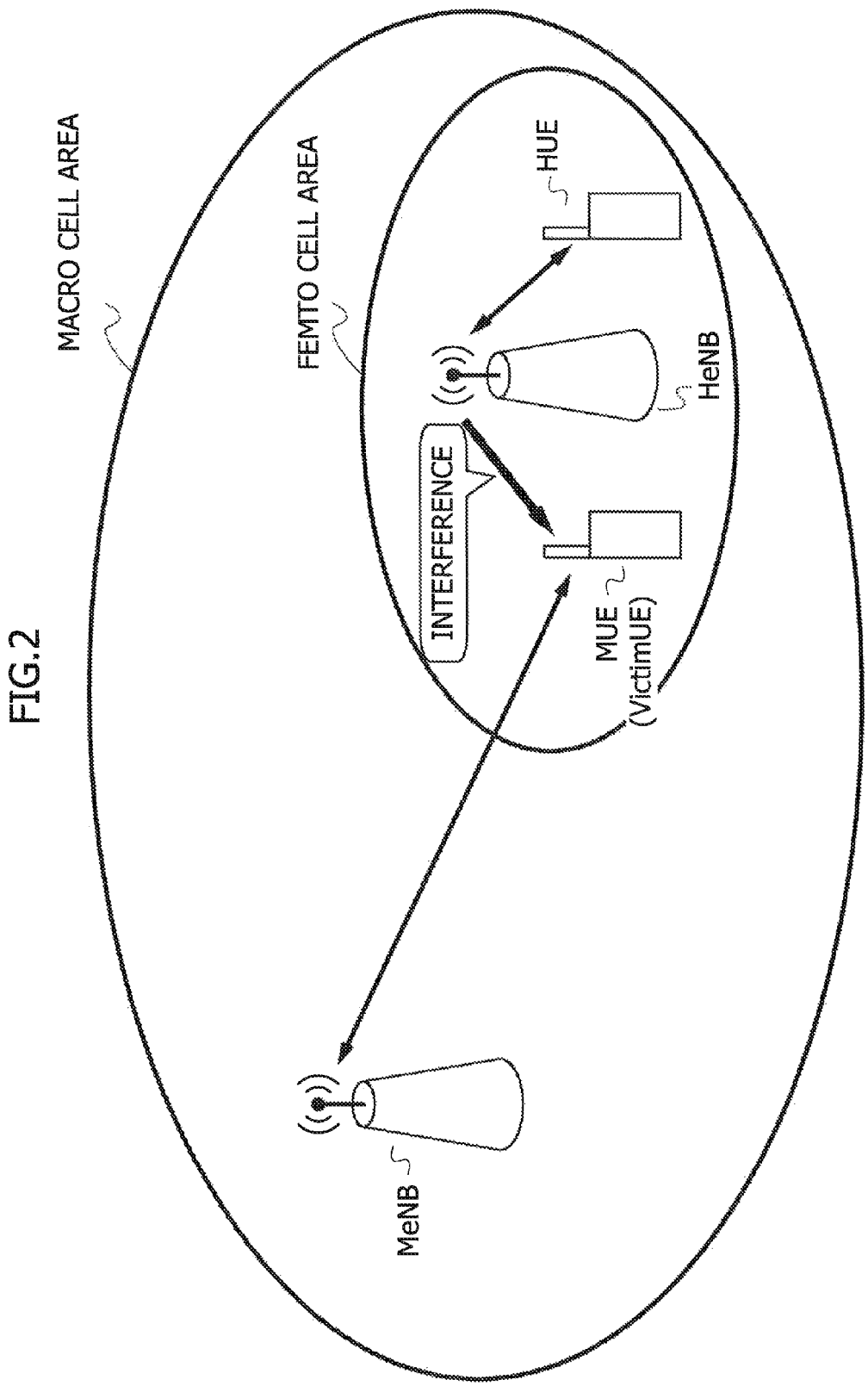
FIG. 2 is a diagram illustrating an example of a macro cell area and a Closed Access femto cell area within the macro cell area.

FIG. 2 is a diagram illustrating an example of the macro cell area and the Closed Access femto cell area within the macro cell area. The example of FIG. 2 is based on an assumption that there exist, in the vicinity of the HeNB, UE (User Equipment) connecting with the HeNB and MeNB connecting UE not connecting with the HeNB. The UE connecting with the HeNB is a mobile station (HUE: Home User Equipment) of the subscription user. The MeNB connecting UE not connecting with the HeNB is a mobile station (MUE: Macro User Equipment) of the user other than the subscription user.

Due to downlink communications between the HeNB and the HUE, the MUE is affected by the downlink interference and therefore reception SINR (Signal to Interference plus Noise Ratio) in the MUE is deteriorated. The MUE such as this is called VictimUE. In this case, it is desired to improve the communication quality under interference control. An SINR improving method of the VictimUE is given by reducing a quantity of interference exerted on the VictimUE while decreasing the transmission power of the HeNB in accordance with a result of checking whether the VictimUE exists or not and improving the reception SINR in the MUE.

Under the PDSCH transmission power control, the adjustment of the common pilot power (RS Power) does not enable the transmission power to be changed following the detection of the VictimUE, while the adjustment of the power offset (p-a) enables the quicker change than the "RS Power" but has a problem of being small in adjustment width. Hence, when detecting whether the VictimUE exists or not, such an event occurs as to wait for a change to the "RS Power" taking account of the VictimUE, and it happens as the case may be that the VictimUE is continuously affected by the interference and that the transmission power remains lower than an ideal level when the VictimUE disappears.

An embodiment will hereinafter be described with reference to the drawings. A configuration of the embodiment is an exemplification, and the present invention is not limited to the configuration of the embodiment of the disclosure. Herein, a discussion will be made by exemplifying a femto base station apparatus by way of a wireless base station apparatus, however, the wireless base station apparatus is not limited to the femto base station apparatus. A configuration of the femto base station apparatus in an embodiment can be applied to wireless base station apparatuses other than the femto base station apparatus.

Herein, the description will be made as being applied to a LTE system, however, the embodiment is not limited to the LTE system but can be applied to other communication systems.

Embodiment

Example of Configuration

Figure 3:
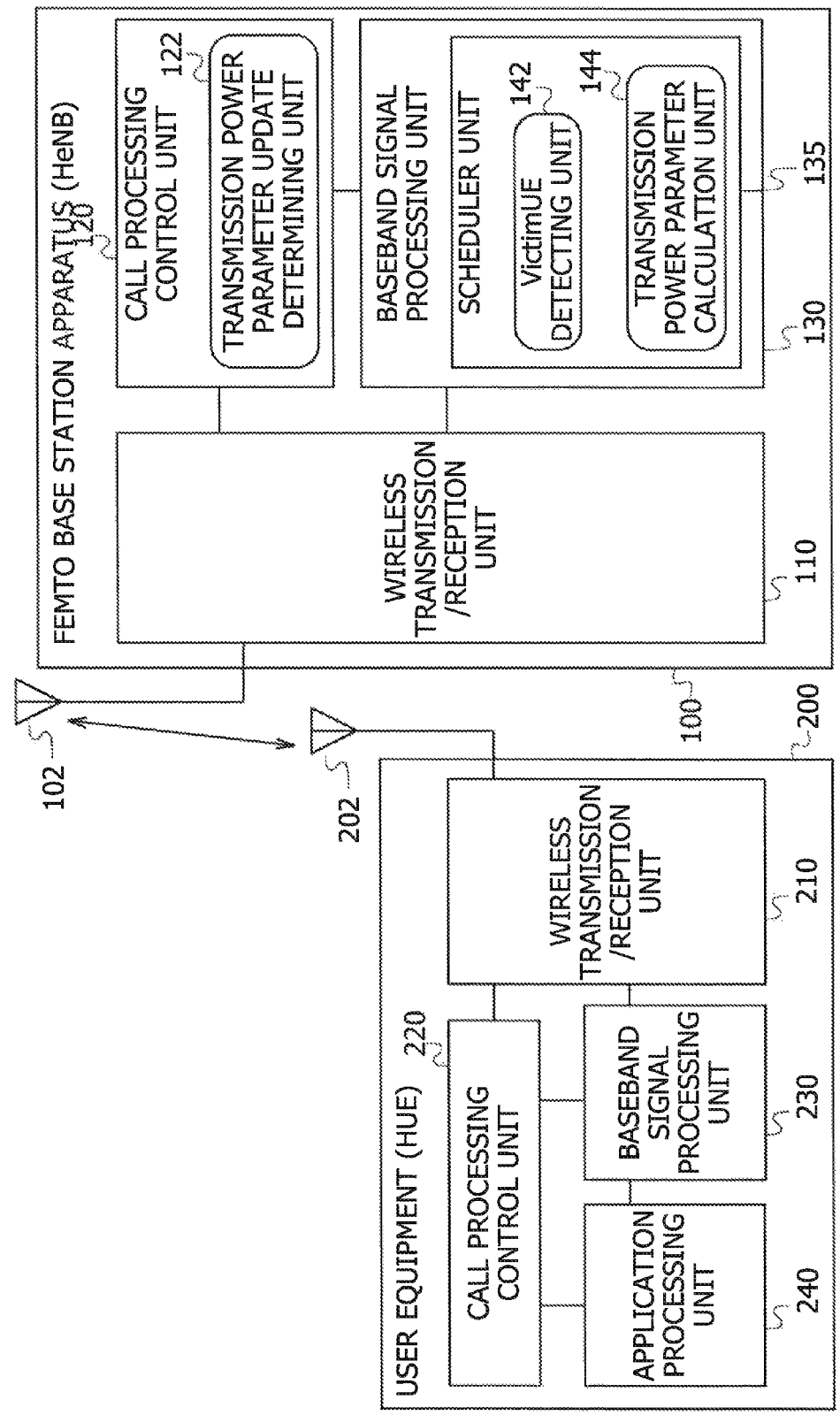
FIG. 3 is a diagram illustrating examples of configurations of a femto base station apparatus and terminal equipment in an embodiment.

FIG. 3 is a diagram illustrating examples of configurations of a femto base station apparatus and a terminal equipment in an embodiment.

A femto base station apparatus 100 includes an antenna 102, a wireless transmission/reception unit 110, a call processing control unit 120 and a baseband signal processing unit 130. The wireless transmission/reception unit 110 includes a transmission power parameter update determining unit 122. The baseband signal processing unit 130 includes a scheduler unit 135. The scheduler unit 135 includes a VictimUE detecting unit 142 and a transmission power parameter calculation unit 144. The femto base station apparatus 100 is connected to a high-order apparatus.

The antenna 102 transmits a radio signal to terminal equipment 200 and receives the radio signal from the terminal equipment 200. The antenna 102 can receive an interference signal.

The wireless transmission/reception unit 110 converts the radio signal received by the antenna 102 into a baseband signal. The wireless transmission/reception unit 110 converts a signal processed by the call processing control unit 120 and the baseband signal processing unit 130 into the radio signal, and transmits the radio signal from the antenna 102.

The call processing control unit 120 makes change determinations of common pilot power (RS Power) and of power offset (p-a) with respect to/the common pilot power, and executes a process of terminating a message (RRC (Radio Resource Control) Message) on the occasion of performing communications with the terminal equipment 200. The call processing control unit 120 conducts call control such as an initial access and handover of each user equipment on the basis of a connection request being output by the wireless transmission/reception unit 110. The common pilot power (RS Power) is one example of a first parameter. The power offset (p-a) is one example of a second parameter.

The transmission power parameter update determining unit 122 determines which update, the update of the parameters "RS Power" and "p-a" or the update of the parameter "p-a", is executed.

The baseband signal processing unit 130 has a function, by the scheduler unit 135, about generating the baseband signal for performing the communications with the terminal equipment 200.

The scheduler unit 135 executes a scheduling process for the terminal equipment. The scheduler unit 135 allocates resources in a timewise direction and in a frequencywise direction when channel resources are shared between or among plural users as in a LTE system. The scheduler unit 135 includes the VictimUE detecting unit 142 and the transmission power parameter update calculation unit 144.

The VictimUE detecting unit 142 detects a VictimUE. Any type of method may be adopted as a method of detecting the VictimUE. For example, the VictimUE detecting unit 142 detects, as the VictimUE, a sender UE (MUE) of an interference signal with reception power being equal to or larger than a predetermined value. The VictimUE detecting unit 142 may also detect the number of the VictimUEs. Further, for instance, the VictimUE detecting unit 142 detects the VictimUE by the method described in Patent document 1. The VictimUE detecting unit 142 can detect whether or not the VictimUE exists within a femto cell of the femto base station apparatus 100. Moreover, e.g., the VictimUE detecting unit 142, when the reception signal of the interference signal is less than the predetermined value, determines that the VictimUE disappears. The interference signal is a signal transmitted from the terminal equipment etc. other than the terminal equipment being wirelessly connected to the femto base station apparatus 100. Interference power is the reception power of the interference signal. The VictimUE detecting unit 142 is one example of a detection unit.

The transmission power parameter calculation unit 144 calculates the transmission power parameters ("RS Power" and "p-a") in accordance with a result of detecting the VictimUE by the VictimUE detecting unit 142. The transmission power parameter calculation unit 144 is one example of a power calculation unit.

The terminal equipment 200 includes an antenna 202, a wireless transmission/reception unit 210, a call processing control unit 220, a baseband signal processing unit 230 and an application processing unit 240.

The terminal equipment 200 receives the radio signal from the base station apparatus via the antenna 202 by the wireless transmission/reception unit 210, and demodulates the received signal by a modulation method and a communication method corresponding to transmission parameters (the modulation method and the communication method etc.) set on the side of the base station apparatus. The base station apparatus can include a macro base station apparatus and a femto base station apparatus.

The antenna 202 transmits the radio signal to the base station apparatus etc., and receives the radio signal from the base station apparatus etc.

The wireless transmission/reception unit 210 receives the radio signal from the base station apparatus via the antenna 202. The wireless transmission/reception unit 210 demodulates the received signal by the modulation method and the communication method corresponding to the transmission parameters (the modulation method and the communication method etc.) set on the side of the base station apparatus. The wireless transmission/reception unit 210 converts the baseband signal processed by the baseband signal processing unit 230 into the radio signal.

The call processing control unit 220 executes the process of terminating the message (RRC Message) on the occasion of performing the communications with the base station apparatus. The call processing control unit 220 conducts the call control such as an access and handover to the femto base station apparatus 100 on the basis of a connection request being output by the wireless transmission/reception unit 210.

The baseband signal processing unit 230 executes, based on the transmission parameters which has been notified from the base station apparatus, the process of demodulating the received baseband signal.

The application processing unit 240 receives an input of the post-demodulating signal and executes a variety of processes being implementable by the terminal equipment 200.

Figure 4:
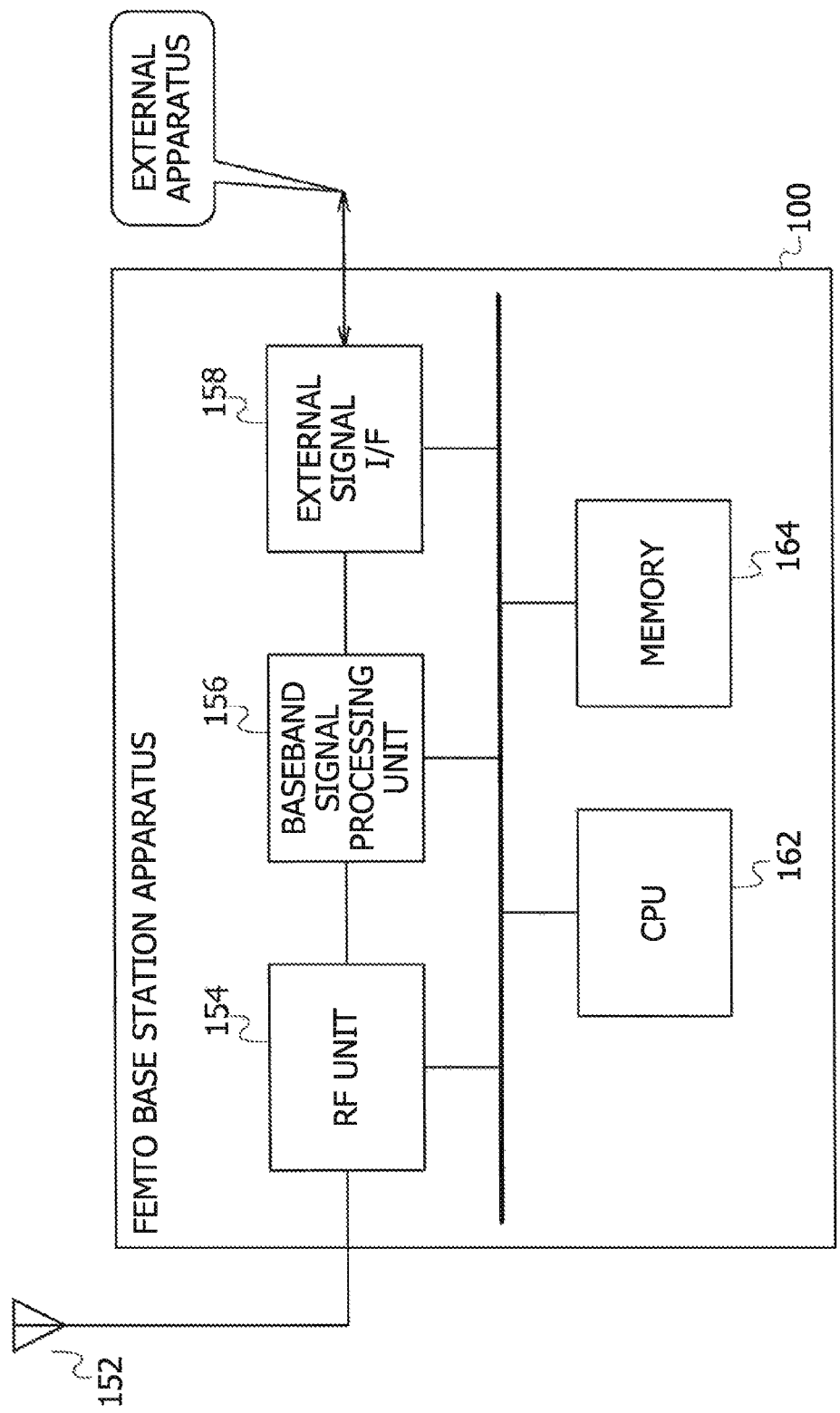
FIG. 4 is a diagram illustrating an example of a hardware configuration of the femto base station apparatus.

FIG. 4 is a diagram illustrating a hardware configuration of the femto base station apparatus. An example in FIG. 4 is that the femto base station apparatus 100 includes an antenna 152, an RF (Radio Frequency) unit 154, a baseband signal processing unit 156, an external signal I/F (interface) unit 158, a CPU (Central Processing Unit) 162 and a memory 164.

The antenna 152 transmits the radio signal to another wireless apparatus and receives the radio signal from another wireless apparatus.

The RF unit 154 converts the radio signal into an electric signal. The RF unit 154 includes a drive circuit of the radio signal supplied to the antenna 152, a radio signal receiving circuit to process the signal coming from the antenna 152, and so on. The RF unit 154 actualizes a process of the radio signal related to the wireless communications with the terminal equipment etc.

The baseband signal processing unit 156 executes a predetermined signal process on the electric signal. The predetermined signal process is exemplified such as terminating the transmission/reception signals and a protocol conversion.

The external signal I/F unit 158 transmits and receives the signals to and from an external network apparatus. The external signal I/F unit 158 is, e.g., a LAN (Local Area Network) interface board or a wireless communication circuit for the wireless communications.

The CPU 162 is a processor to manage and control operations of the whole femto base station apparatus 100. The memory 164 stores an operation program executed by the CPU 162 and data etc. used for the program. Another processor such as a DSP (Digital Signal Processor) may be employed as a substitute for the CPU 162. The memory 164 is exemplified such as a RAM (Random Access Memory) and a ROM (Read Only Memory). The memory 164 stores, e.g., target power of data channel power.

Example of Operation

Figure 5:
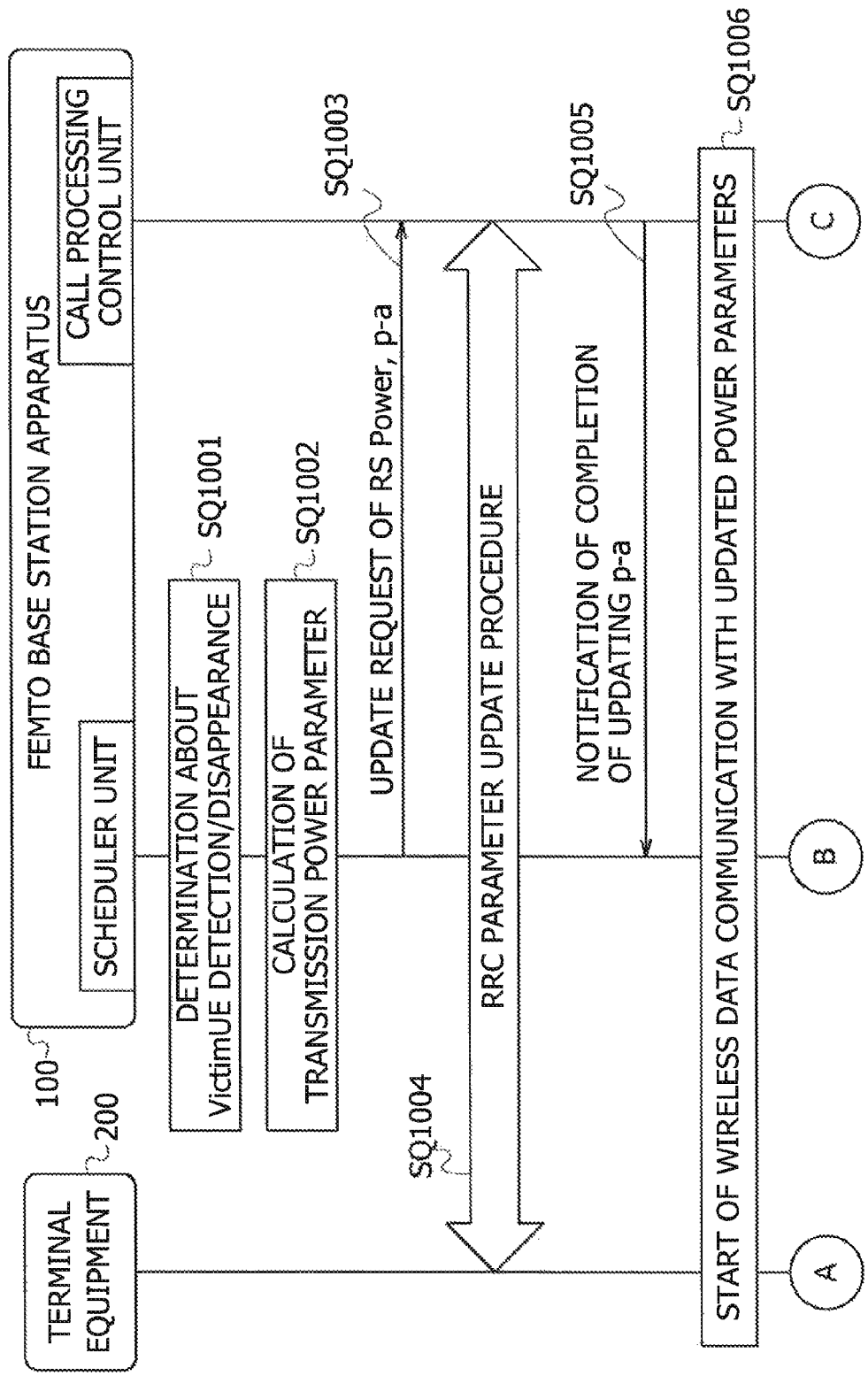
FIG. 5 is a diagram illustrating an example (1) of an operation sequence between the femto base station apparatus and the terminal equipment.
Figure 6:
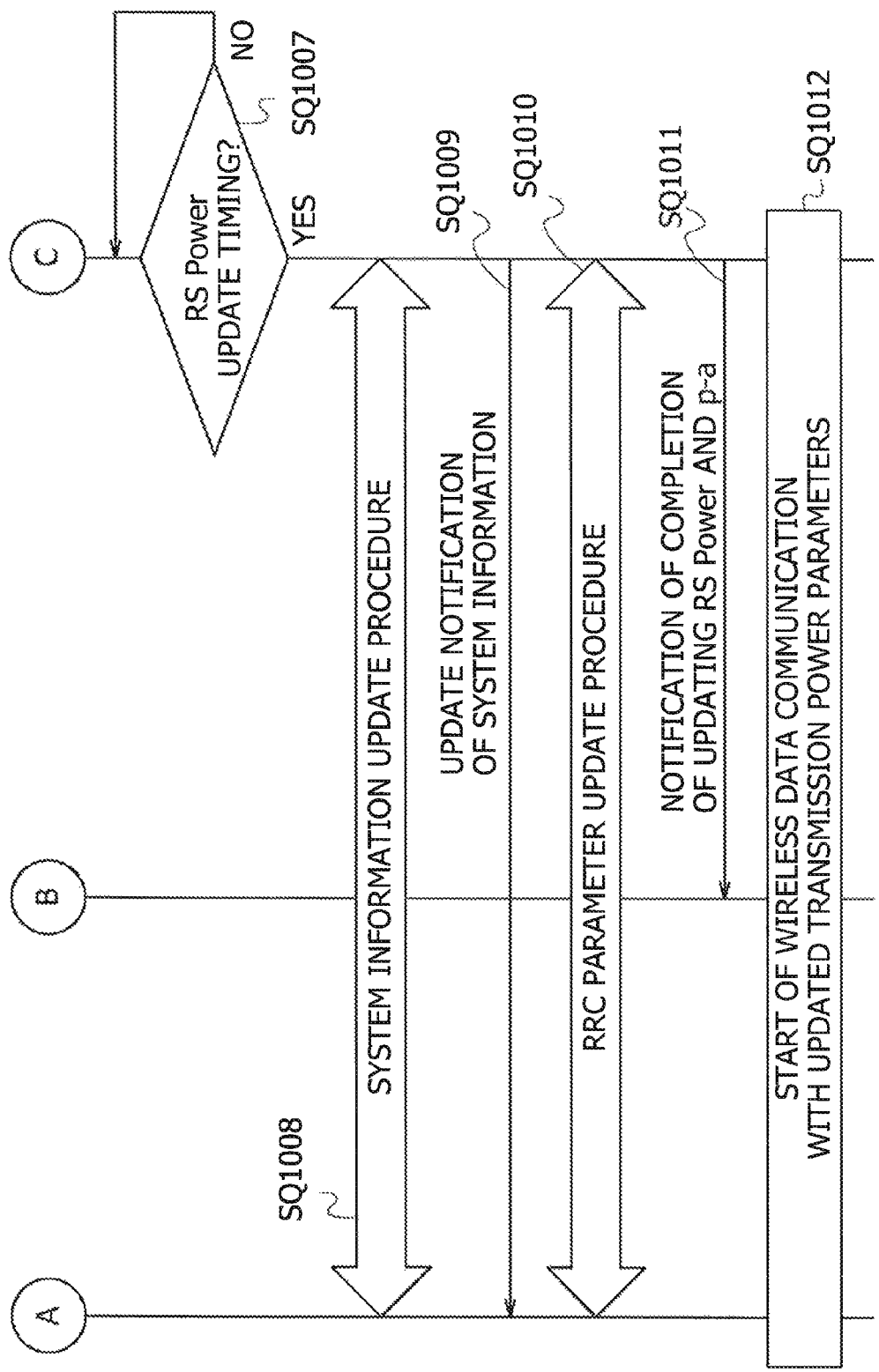
FIG. 6 is a diagram illustrating an example (2) of the operation sequence between the femto base station apparatus and the terminal equipment.

FIGS. 5 and 6 are diagrams each illustrating an example of an operation sequence between the femto base station apparatus and the terminal equipment. The symbols "A", "B" and "C" in FIG. 6 are continued from the symbols "A", "B" and "C" in FIG. 5, respectively. It is assumed that the femto base station apparatus 100 is wirelessly connected to the user equipment 200.

The VictimUE detecting unit 142 of the scheduler unit 135 of the femto base station apparatus 100 detects whether the VictimUE is detected or disappears (SQ1001). The VictimUE detecting unit 142 checks whether or not the VictimUE exists within the femto cell of the femto base station apparatus 100 at an interval of predetermined time.

The detection of the VictimUE connotes that the femto base station apparatus 100 newly recognizes existence of the VictimUE not existing so far within the femto cell of the femto base station apparatus 100.

The disappearance of the VictimUE connotes that the femto base station apparatus 100 newly recognizes non-existence of the VictimUE existing so far within the femto cell of the femto base station apparatus 100.

The VictimUE detecting unit 142, when there is no change in existence/non-existence (existing or not) of the VictimUE within the femto cell of the femto base station apparatus 100, does not need to execute processes from SQ1002 onwards.

The scheduler unit 135 calculates, based on a result of the determination of the VictimUE detecting unit 142, the transmission power parameter (SQ1002). The transmission power parameter calculation unit 144 of the scheduler unit 135 calculates a new transmission power parameter on the basis of the determination result and the present transmission power parameter.

A downlink transmission channel includes a common pilot channel and a data channel. Common pilot channel power of the downlink transmission channel and data channel power of the downlink transmission channel are set based on the transmission power parameter. The common pilot channel power of the downlink transmission channel is defined as transmission power (RS Power) of a reference signal (Reference Signal) corresponding to the common pilot signal of the downlink transmission channel. The data channel power of the downlink transmission channel is defined as a total value of the "RS Power" and the power offset (p-a) with respect to this transmission power (RS Power). The data channel of the downlink transmission channel is, e.g., PDSCH (Physical Downlink Shared Channel). The transmission power parameters are herein assumed to be the "RS Power" and the "p-a". Other parameters may also be adopted as the transmission power parameters.

Let "RSPower_now" and "p-a_now" be the present (pre-update) "RS power" and "p-a", respectively. At this time, the present common pilot channel power and the present data channel power are expressed such as "RSPower_now" and "RSPower_now+p-a_now", respectively.

Let "Target" be target power of the post-update data channel power. The target power is to be within an range being adjustable by the parameters "RS Power" and "p-a". When detecting the VictimUE, the target power (Target) is set lower than when the VictimUE does not exist. The target power being set low intends to restrain the interference with the VictimUE. Further, the target power when detecting the VictimUE may also be set depending on the number of VictimUEs to be detected. For example, as the number of the VictimUEs to be detected becomes larger, the target power may be set lower.

When the VictimUE disappears, the target power (Target) is set higher than the target power before the VictimUE disappears.

The target power of the data channel power when the VictimUE is detected and the target power of the data channel power when the VictimUE disappears, are previously set.

Herein, let "pa-_max" be a maximum value that can be taken by the "p-a" and "p-a_min" be a minimum value that can be taken by the "p-a". Namely, the "p-a" can take values ranging from the "p-a_min" up to the "pa-_max". The "pa-_max" and the "p-a_min" are previously set.

When the determination result indicates the "detection of VictimUE", the transmission power parameter calculation unit 144 sets the target power "Target" to predetermined target power on the occasion of the "detection of VictimUE". Further, the transmission power parameter calculation unit 144 sets the larger of a value of "Target−RSPower_now" and a value of "p-a_min" to a first new power offset "p-a_new1". Moreover, the transmission power parameter calculation unit 144 sets a value of "Target−p-a_min" to new common pilot channel power "RSPower_new". The transmission power parameter calculation unit 144 sets the value of "p-a_min" to second new power offset "p-a_new2".

Whereas when the determination result indicates the "disappearance of VictimUE", the transmission power parameter calculation unit 144 set the target power "Target" to predetermined target power on the occasion of the "disappearance of VictimUE". The predetermined target power on the occasion of the "disappearance of VictimUE" is larger than the predetermined target power on the occasion of the "detection of VictimUE". Furthermore, the transmission power parameter calculation unit 144 sets the smaller value of "Target−RSPower_now" and "p-a_max" to the first new power offset "p-a_new1". Moreover, the transmission power parameter calculation unit 144 sets a value of "Target−p-a_max" to the new common pilot channel power "RSPower_new". The transmission power parameter calculation unit 144 sets the value of "p-a_max" to the second new power offset "p-a_new2".

The transmission power parameter calculation unit 144 requests the call processing control unit 120 to update the parameters "RS Power" and "p-a" (SQ1003). Further, the transmission power parameter calculation unit 144 transmits, to the call processing control unit 120, the values of "p-a_new1", "RSPower_new" and "p-a_new2", these values being set in SQ1002.

The transmission power parameter update determining unit 122 of the call processing control unit 120, upon receiving the update request etc. from the transmission power parameter calculation unit 144, an RRC parameter update procedure according to the RRC message with the terminal equipment 200 (SQ1004). The RRC parameter update procedure being done, the value of the power offset "p-a" is changed into the value of the "p-a_new1".

The call processing control unit 120, upon completing the RRC parameter update procedure with the terminal equipment 200, issues update completion notification of the power offset "p-a" to the scheduler unit 135 (SQ1005). The transmission power parameter calculation unit 144 of the scheduler unit 135 sets the post-update power offset as the value of "p-a_now".

After completing the update of the power offset "p-a", the wireless data communications based on the updated transmission power parameters are started between the femto base station apparatus 100 and the terminal equipment 200 (SQ1006). At this time, the value of the common pilot channel power is the "RSPower_now", and the value of the user channel power is the "RSPower_now+p-a_new1".

The transmission power parameter update determining unit 122 of the call processing control unit 120 determines whether present timing is RS Power update timing or not (SQ1007). In the LTE system, the "RS Power" corresponds to system information. Accordingly, the RS Power update timing is the same as system information update timing. The system information is updated, e.g., at the interval of the predetermined time. At this time, the system information update timing is set per predetermined time. When the present timing is not the RS Power update timing (SQ1007; NO), the transmission power parameter update determining unit 122 stands by till the RS Power update timing is reached. A system information update period is, e.g., 100 ms.

When the present timing is the RS Power update timing (SQ1007; YES), the transmission power parameter update determining unit 122 makes a system information update procedure with the terminal equipment 200 (SQ1008). The system information contains information indicating that the value of the "RSPower_new" received in SQ1003 is set as the common pilot channel power "RS Power".

The call processing control unit 120, upon completing the system information update procedure with the terminal equipment 200, notifies the terminal equipment 200 of the update of the system information (SQ1009).

Furthermore, the transmission power parameter update determining unit 122 of the call processing control unit 120 performs the RRC parameter update procedure according to the RRC message with the terminal equipment 200 (SQ1010). The RRC parameter update procedure being carried out, the value of the power offset "p-a" is changed into the value of the "p-a_new2".

The process in SQ1010 may also be executed between SQ1007 and SQ1008 or between SQ1008 and SQ1009.

The call processing control unit 120, upon completing the system information update procedure and the RRC parameter update procedure with the terminal equipment 200, issues the update completion notifications of the common pilot channel power "RS Power" and of the power offset "p-a" to the scheduler unit 135 (SQ1011). The transmission power parameter calculation unit 144 of the scheduler unit 135 sets the post-update common pilot channel power as the value of the "RSPower_now" and the post-update power offset as the value of the "p-a_now".

After the completion of updating the common pilot channel power and the power offset "p-a", the wireless data communications are started by use of the updated transmission power parameters between the femto base station apparatus 100 and the terminal equipment 200 (SQ1012). At this time, the value of the common pilot channel power is the "RSPower_new", and the value of user channel power is the "RSPower_new+p-a_new2".

Thereafter, the processes from SQ1001 onwards are repeated between the femto base station apparatus 100 and the terminal equipment 200. The processes from SQ1001 onwards may also be executed per predetermined time.

Thus, the femto base station apparatus 100 controls the "p-a" and the "RS Power" to maximize an adjustment width of the power offset, thereby enabling the data channel power to quickly follow the target power being changed along with the VictimUE detection/disappearance.

When the value of the "RSPower_new" calculated in SQ1002 is equal to the value of the "RSPower_now", the processes from SQ1007 to SQ1012 does not need to be executed. In this case, it is because the "RS Power" is not changed.

The RS Power update timing is when the call processing control unit 120 receives the RS Power and p-a change request in SQ1003, in which case the processes from SQ1004 to SQ1007 does not need to be executed.

The transmission power parameter calculation unit 144 may calculate the "p-a_new1" in advance, and may also calculate the "RSPower_new" and the "p-a_new2" when reaching the RS Power update timing.

Specific Example

Figure 7:
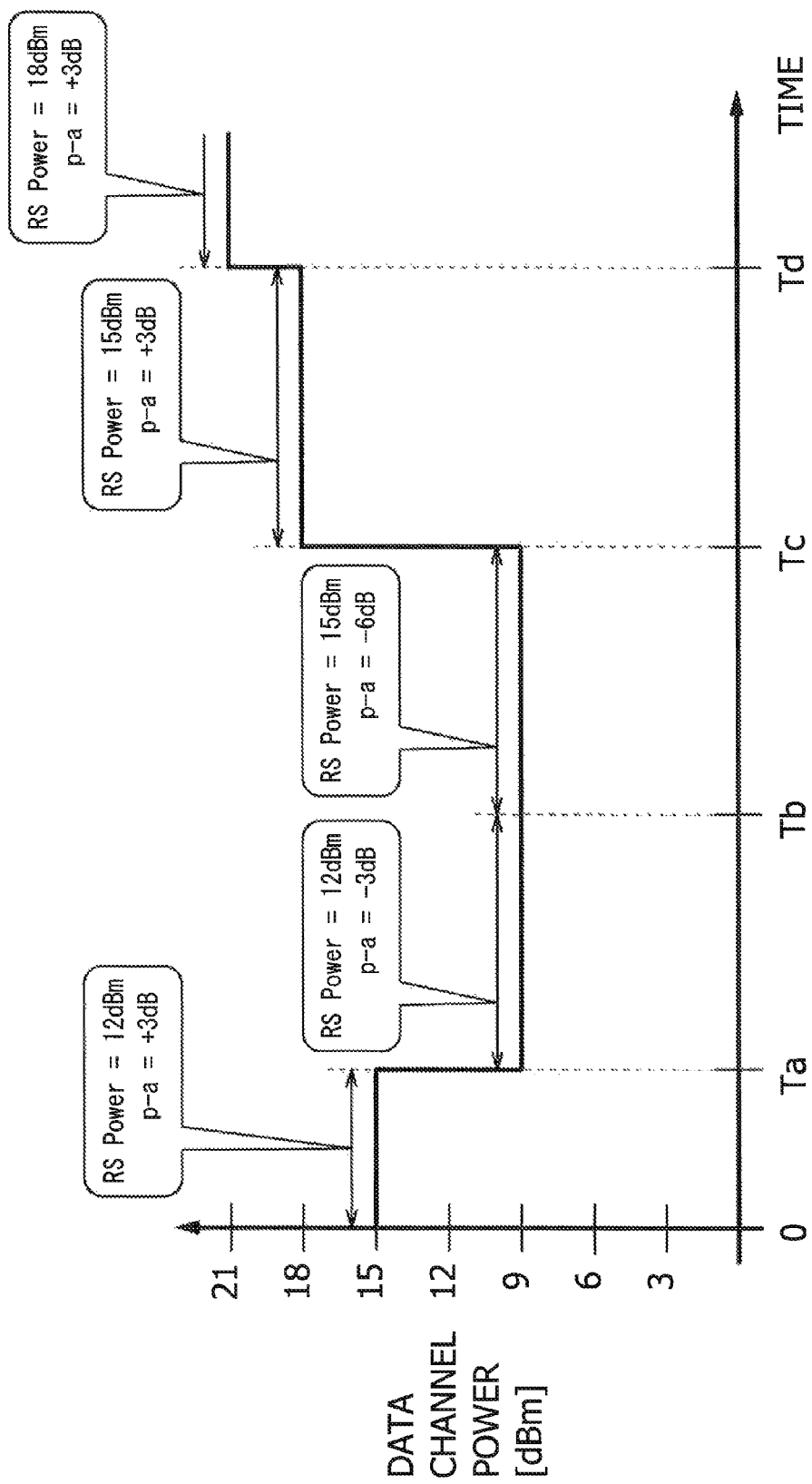
FIG. 7 is a diagram illustrating a specific example of a time variation of data channel power.

FIG. 7 is a diagram illustrating a specific example of a time variation of the data channel power. The axis of abscissa in a graph of FIG. 7 indicates the time, and the axis of ordinate indicates the data channel power. The data channel power is defined by a sum of the "RS Power" and the "p-a". The common pilot channel power is the "RS Power". Herein, it is assumed that the "p-a_max" of the femto base station apparatus 100 is "+3 dB", and the "p-a_min" is "−6 dB". It is further assumed that the target power of the data channel power when detecting the VictimUE is "9 dBm", and target power of the data channel power when the VictimUE disappears is "21 dBm". It is still further assumed that the VictimUE does not exist within the femto cell of the femto base station apparatus 100 at a point of the timing "0".

At the timing "0", in the femto base station apparatus 100, an assumption is that the "RS Power" is set to "12 dBm", and the "p-a" is set to "+3 dB". At this time, the data channel power is given such as "12 dBm+3 dB=15 dBm".

At timing Ta, the VictimUE detecting unit 142 of the femto base station apparatus 100 detects the VictimUE. The transmission power parameter calculation unit 144 of the femto base station apparatus 100, as the VictimUE is detected, sets the target power (Target) to "9 dBm". The transmission power parameter calculation unit 144 sets, as a value of "p-a_new1", "−3 dB" which is the larger of a value given by "9 dBm−12 dBm=−3 dB" and a value of "−6 dB". The transmission power parameter calculation unit 144 sets "9 dBm−(−6 dB)=15 dBm" as the value of "RSPower_new". The transmission power parameter calculation unit 144 sets "−6 dB" as a value of "p-a_new2". The transmission power parameter calculation unit 144 transmits the thus-obtained parameters to the call processing control unit 120.

The transmission power parameter update determining unit 122 of the call processing control unit 120 performs the RRC parameter update procedure according to the RRC message with the terminal equipment 200, and changes the power offset "p-a" to "−3 dB (p-a_new1)". With this change, the data channel power of the downlink transmission channel at the timing Ta becomes "12 dBm+(−3 dB)=9 dBm".

The transmission power parameter update determining unit 122 determines whether the present timing is the RS Power update timing or not. When timing Tb is the RS Power update timing, the transmission power parameter update determining unit 122 conducts the system information update procedure with the terminal equipment 200, and changes the "RS Power" to "15 dBm (RSPower_new)". Further, the transmission power parameter update determining unit 122 carries out the RRC parameter update procedure according to the RRC message with the terminal equipment 200, and changes the power offset "p-a" to "−6 dB (p-a_new2)". With this change, the data channel power of the downlink transmission channel at the timing Tb becomes "15 dBm+(−6 dB)=9 dBm". Namely, at the timing Tb, the data channel power remains unchanged at "9 dBm", however, the "RS Power" and the "p-a" are changed. At this point of time, the "RSPower_now" is "15 dBm", and the "p-a_now" is "−6 dB".

The "RS Power" and the "p-a" being "15 dBm" and "−6 dB (=p-a_min)" respectively, the femto base station apparatus 100 can implement "+9 dB (=(+3 dB)−(−6 dB))" as the maximum adjustment width of "p-a" with respect to the data channel power through the change of the power offset "p-a".

At timing Tc, the VictimUE detecting unit 142 of the femto base station apparatus 100 detects the disappearance of the VictimUE. The transmission power parameter calculation unit 144 of the femto base station apparatus 100 sets the target power (Target) to "21 dBm" because of the disappearance of the VictimUE. The transmission power parameter calculation unit 144 sets, as a value of "p-a_new1", "+3 dB" which is the smaller value of "21 dBm−15 dBm=+6 dB" and "+3 dB". The transmission power parameter calculation unit 144 sets the "21 dBm−(+3 dB)=18 dBm" as a value of "RSPower_new". The transmission power parameter calculation unit 144 sets "+3 dB" as a value of "p-a_new2". The transmission power parameter calculation unit 144 transmits the thus-obtained parameters to the call processing control unit 120.

The transmission power parameter update determining unit 122 of the call processing control unit 120 makes the RRC parameter update procedure according to the RRC message with the terminal equipment 200, and changes the power offset "p-a" to "+3 dB (p-a_new1)". With this change, at the timing Tc, the data channel power of the downlink transmission channel becomes "15 dBm+(+3 dB)=18 dBm". After the femto base station apparatus 100 has detected the disappearance of the VictimUE but before changing the "RS Power", the data channel power can be increased from "9 dBm" up to "18 dBm".

The transmission power parameter update determining unit 122 determines whether the present timing is the RS Power update timing or not. When timing Td is the RS Power update timing, the transmission power parameter update determining unit 122 performs the system information update procedure with the terminal equipment 200, and changes the "RS Power" to "18 dBm (RSPower_new)". Further, the transmission power parameter update determining unit 122 conducts the RRC parameter update procedure according to the RRC message with the terminal equipment 200, and changes of the power offset "p-a" to "+3 dB (p-a_new2)". With this change, at the timing Td, the data channel power of the downlink transmission channel becomes "18 dBm+(+3 dB)=21 dBm". Namely, at the timing Td, the data channel power is changed from "18 dBm" to "21 dBm". At this point of time, the "RSPower_now" is "18 dBm", and the "p-a_now" is "+3 dB".

The "RS Power" and the "p-a" being "18 dBm" and "+3 dBm (=p-a_max)" respectively, the femto base station apparatus 100 can implement "−9 dB (=(−6 dB)−(+3 dB))" as the maximum adjustment width of "p-a" with respect to the data channel power through the change of the power offset "p-a".

Thus, the femto base station apparatus 100 enables the data channel power to follow the target power in a way that corresponds to the change of the target power of the data channel power along with the VictimUE detection/disappearance.

Operation and Effect of Embodiment

The femto base station apparatus 100, when changing the data channel power of the downlink transmission channel, changes the data channel power on the basis of the "RS Power" and the "p-a" after making the change using the power offset "p-a". The change based on the "RS Power" and the "p-a" involves minimizing the "p-a" when the data channel power is changed down to the low level and maximizing the "p-a" when the data channel power is changed up to the high level. The femto base station apparatus 100 can quickly change the transmission power (the data channel power of the downlink transmission channel) by maximizing or minimizing the "p-a". The femto base station apparatus 100 can restrain the interference with the VictimUE by decreasing the transmission power promptly when detecting the VictimUE. Furthermore, the femto base station apparatus 100 can enhance a quality of the communications with the terminal equipment connected to the femto base station apparatus 100 by increasing the transmission power promptly when the VictimUE disappears (from the femto cell).

Modified Example

In the discussion made above, the value (p-a_new2) of the "p-a" to be changed together with the "RS Power" is set to the maximum value (p-a_max) of the "p-a" or the minimum value (p-a_min) of the "p-a". In a modified example, the value (p-a_new2) of the "p-a" to be changed together with the "RS Power" is contrived to take values other than but inclusive of "p-a_max" and "p-a_min" on the basis of a predetermined condition.

Example of Operation

Operations of the femto base station apparatus and the terminal equipment in the modified example are different by way of the example of the operation described above mainly from the operations (SQ1001 and SQ1002) of the VictimUE detecting unit 142 and the transmission power parameter calculation unit 144 of the scheduler unit 135 of the femto base station apparatus 100. Herein, mainly the operations of the VictimUE detecting unit 142 and the transmission power parameter calculation unit 144 of the femto base station apparatus 100 will be described. Explanations of the operations common to the example described above are omitted.

The VictimUE detecting unit 142 of the scheduler unit 135 of the femto base station apparatus 100 determines as to the VictimUE detection/disappearance. The VictimUE detecting unit 142 checks, e.g., at the interval of the predetermined time whether the VictimUE exists within the femto cell of the femto base station apparatus 100 or not. The VictimUE detecting unit 142 determines as to the VictimUE detection/disappearance in the way of depending on whether, e.g., the uplink interference power is equal to or larger than the predetermined value or less than the predetermined value.

Furthermore, the VictimUE detecting unit 142 measures uplink interference power from the VictimUEs and interfering UEs (prospective VictimUEs) existing within and in the periphery of the femto cell. The uplink interference power from the VictimUEs and the interfering UEs existing within and in the periphery of the femto cell, depend on the number of the VictimUEs and the interfering UEs existing within and in the periphery of the femto cell. Namely, a tendency is such that as the levels of uplink interference power from the VictimUEs and the interfering UEs become larger, there is an increased number of the VictimUEs the interference affecting UEs existing within and in the periphery of the femto cell. The VictimUEs and the interfering UEs existing within and in the periphery of the femto cell include the MUEs and the UEs connected to other femto base station apparatuses. The interference affecting UE is defined as the MUE with the uplink interference power being as low as not being detected as the VictimUE in the femto base station apparatus 100 and also the UE connected to another femto cell. When the interfering UE moves close to the femto cell of the femto base station apparatus 100, the femto base station apparatus 100 may detect this interfering UE as the VictimUE.

The scheduler unit 135 calculates the transmission power parameters on the basis of the determination result and the measurement result of the VictimUE detecting unit 142. The transmission power parameter calculation unit 144 of the scheduler unit 135 calculates new transmission power parameters on the basis of the determination result, the measurement result and the present transmission power parameters.

The downlink transmission channel includes the common pilot channel and the data channel. The common pilot channel power of the downlink transmission channel and the data channel power of the downlink transmission channel are set based on the transmission power parameters. The common pilot channel power of the downlink transmission channel is defined as transmission power (RS Power) of the reference signal (Reference Signal) corresponding to the common pilot signal of the downlink transmission channel. The data channel power of the downlink transmission channel is a total value of the "RS Power" and the power offset (p-a) with respect to the transmission power (RS Power). The data channel of the downlink transmission channel is, e.g., the PDSCH (Physical Downlink Shared Channel). The transmission power parameters are, herein, to be the "RS Power" and the "p-a". Other parameters may also be adopted as the transmission power parameters.

Let "RSPower_now" and "p-a_now" be the "RS Power" and the "p-a" at the present (pre-update). Hereat, the present common pilot channel power is expressed by the "RSPower_now". Further, the present data channel power is expressed by "RSPower_now+p-a_now".

Let "Target" be the target power of the post-update data channel power. The target power is to be within a range being adjustable by the "RS Power" and the "p-a". When the VictimUE is detected, the target power (Target) is set lower than when the VictimUE does not exist. The target power being set low intends to restrain the interference with the VictimUE. Further, the target power when detecting the VictimUE may also be set depending on the number of VictimUEs to be detected. For example, as the number of the VictimUEs to be detected becomes larger, the target power may be set lower.

When the VictimUE disappears, the target power (Target) is set higher than before the VictimUE disappears.

The target power of the data channel power when the VictimUE is detected and the target power of the data channel power when the VictimUE disappears, are previously set.

Herein, let "pa-_max" be a maximum value that can be taken by the "p-a" and "p-a_min" be a minimum value that can be taken by the "p-a". Namely, the "p-a" can take values ranging from the "p-a_min" up to the "p-a_max". The "p-a_max" and the "p-a_min" are previously set.

When the determination result indicates the "detection of VictimUE", the transmission power parameter calculation unit 144 sets the target power "Target" to predetermined target power on the occasion of the "detection of VictimUE". Further, the transmission power parameter calculation unit 144 sets the larger of a value of "Target−RSPower_now" and a value of "p-a_min" to a first new power offset "p-a_new1".

Moreover, the transmission power parameter calculation unit 144 sets a value of "Target−(p-a_max−Δoffset1) to the new common pilot channel power "RSPower_new". The transmission power parameter calculation unit 144 sets a value of "p-a_max−Δoffset1" to a second new power offset "p-a_new2". The value "Δoffset1" is one example of a first offset value.

FIG. 8 is a table representing an example of a way of how the "Δoffset1" is determined. The "Δoffset1" is determined, e.g., as follows based on the measurement result of the uplink interference power. The transmission power parameter calculation unit 144 determines, based on a gradient given when approximating a time variation of the interference power from before a predetermined period of time up to the present timing with a linear function, whether the number of VictimUEs increases or decreases or whether a variation in the number of VictimUEs is small or not.

The gradient given when approximating the time variation of the interference power for the predetermined period of time up to the present timing with the linear function is equal to or larger than a predetermined positive value, in which case the transmission power parameter calculation unit 144 determines that the number of VictimUEs within the femto cell increases. At this time, it is predicted that the VictimUEs will further increase in number, and hence the offset value is set such as "Δoffset1=+3 dB" so that the data channel power can be promptly further decreased to a great degree. Hereat, the data channel power can be quickly adjusted from "+3 dB" to "−6 dB" with respect to the "RS Power" by the "p-a".

The gradient given when approximating the time variation of the interference power for the predetermined period of time up to the present timing with the linear function is equal to or larger than a predetermined negative value but is less than the predetermined positive value, in which case the transmission power parameter calculation unit 144 determines that the variation in the number of VictimUEs within the femto cell is small. Namely, the transmission power parameter calculation unit 144 determines that there is no change of the number of VictimUEs within the femto cell. At this time, the offset value is set to "Δoffset1=+6 dB" so that the data channel power can be quickly increased and decreased as well. Hereat, the data channel power can be promptly adjusted from "+6 dB" to "−3 dB" with respect to the "RS Power" by the "p-a".

The gradient given when approximating the time variation of the interference power for the predetermined period of time up to the present timing with the linear function is less than the predetermined negative value, in which case the transmission power parameter calculation unit 144 determines that the number of VictimUEs within the femto cell decreases. At this time, it is predicted that the VictimUEs will further decrease in number, and hence the offset value is set such as "Δoffset1=+9 dB" so that the data channel power can be promptly increased to a great degree. Hereat, the data channel power can be quickly adjusted from "+9 dB" to "0 dB" with respect to the "RS Power" by the "p-a".

When the VictimUE transmits the connection request to the femto base station apparatus 100, the femto base station apparatus 100 sends a connection rejection back to this VictimUE. The femto base station apparatus 100 can recognize the number of VictimUEs within the femto cell of the femto base station apparatus 100 by counting the number of connection rejections transmitted at an interval of a predetermined period. Such being the case, the number of connection rejections may also be utilized as the measurement result in place of the uplink interference power.

Whereas when the determination results indicates the "disappearance of the VictimUE", the transmission power parameter calculation unit 144 sets the target power "Target" to predetermined target power on the occasion of the "disappearance of the VictimUE". The predetermined target power on the occasion of the "disappearance of the VictimUE" is larger than the predetermined target power on the occasion of the "detection of the VictimUE". Moreover, the transmission power parameter calculation unit 144 sets the smaller value of "Target−RSPower_now" and "p-a_max" to the first new power offset "p-a_new1".

Moreover, the transmission power parameter calculation unit 144 sets a value of "Target−(p-a_min+Δoffset2)" to the new common pilot channel power "RSPower_new". The transmission power parameter calculation unit 144 sets the value of "p-a_max" in the second new power offset "p-a_new2". The transmission power parameter calculation unit 144 sets a value of "p-a_min+Δoffset2" in the second new power offset "p-a_new2". The value "Δoffset2" is one example of a second offset value.

FIG. 9 is a table representing an example of a way of how the "Δoffset2" is determined. The "Δoffset2" is determined, e.g., as follows based on the measurement result of the uplink interference power.

The gradient given when approximating the time variation of the interference power for the predetermined period of time up to the present timing with the linear function is less than a predetermined negative value, in which case the transmission power parameter calculation unit 144 determines that the number of interfering UEs within the femto cell and in the periphery of the femto cell decreases. At this time, it is predicted that the interfering UEs will further decrease in number, and hence the offset value is set such as "Δoffset2=+3 dB" so that the data channel power can be promptly further increased to a great degree. Hereat, the data channel power can be quickly adjusted from "+6 dB" to "−3 dB" with respect to the "RS Power" by the "p-a".

The gradient given when approximating the time variation of the interference power for the predetermined period of time up to the present timing with the linear function is equal to or larger than the predetermined negative value but is less than the predetermined positive value, in which case the transmission power parameter calculation unit 144 determines that the variation in the number of interfering UEs within the femto cell is small. Namely, the transmission power parameter calculation unit 144 determines that there is no change of the number of interfering UEs within the femto cell. At this time, the offset value is set to "Δoffset2=+6 dB" so that the data channel power can be quickly increased and decreased as well. Hereat, the data channel power can be promptly adjusted from "+3 dB" to "−6 dB" with respect to the "RS Power" by the "p-a".

The gradient given when approximating the time variation of the interference power for the predetermined period of time up to the present timing with the linear function is equal to or larger than the predetermined positive value, in which case the transmission power parameter calculation unit 144 determines that the number of interfering UEs within the femto cell increases. At this time, it is predicted that the VictimUEs will further increase in number, and hence the offset value is set such as "Δoffset2=+9 dB" so that the data channel power can be promptly decreased to a great degree. Hereat, the data channel power can be quickly adjusted from "+6 dB" to "−9 dB" with respect to the "RS Power" by the "p-a".

The offset values "Δoffset1" and "Δoffset2" are stored in, e.g., the memory 164 or a storage device.

Operation and Effect of Modified Example

The femto base station apparatus 100, on the occasion of changing the data channel power of the downlink transmission channel, makes the changes using the parameters "RS Power" and "p-a" after making the change by use of the power offset "p-a". Moreover, the femto base station apparatus 100 determines, on the basis of the time variation of the interference power, whether the VictimUEs and the interfering UEs increase or decrease in number. The femto base station apparatus 100 is contrived to enable the data channel power to quickly increase or decrease to the great degree in a way that depends on the increment or decrement in the number of VictimUEs etc.

The femto base station apparatus 100 can restrain the interference power with the VictimUEs etc. by enabling the transmission power to promptly decrease when the VictimUEs etc. increase in number. Further, the femto base station apparatus 100 can improve the quality of the communications with the terminal equipment connected to the femto base station apparatus 100 by enabling the transmission power to quickly increase when the VictimUEs decrease in number.

The aspect of the disclosure may also be attained in a way that a program is executed by an information processing apparatus. To be specific, a configuration of the disclosure can be specified by a program compiled for respective means in the aspect described above to execute processes for the information processing apparatus, or specified by a non-transitory computer readable recording medium recorded with the program. Further, the configuration of the disclosure may also be specified by a method by which the information processing apparatus executes the processes to be carried out by the respective means described above.

According to an embodiment of the disclosure, it is feasible to provide a wireless base station apparatus capable of quickly changing transmission power.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless base station apparatus to establish a wireless connection with terminal equipment, the wireless base station apparatus comprising:
    a detection unit configured to detect an intensity of a signal transmitted from another terminal equipment other than the terminal equipment; and
    a power calculation unit configured to calculate, as transmission power for the terminal equipment, a sum of a first parameter adjusted at an interval of predetermined time and a second parameter taking a value between a predetermined first minimum value and a predetermined first maximum value,
    wherein the power calculation unit is configured to set, as the second parameter, the larger value of the first minimum value and a difference between first target power and the first parameter when detecting that reception power of the signal transmitted from the another terminal equipment is equal to or larger than a predetermined value, and further set a difference between the first target power and the first minimum value as the first parameter and the first minimum value as the second parameter when the first parameter is adjusted.

2. The wireless base station apparatus according to claim 1, wherein when detecting that the reception power of the signal transmitted from the another terminal equipment is equal to or larger than the predetermined value, the power calculation unit is configured to set, as the first parameter, a value obtained by adding a first offset value to a difference between the first target power and the first minimum value and set, as the second parameter, a difference between the first maximum value and the first offset value when the first offset value is set on the basis of a time variation of the reception power of the signal transmitted from the another terminal equipment and the first parameter is adjusted.

3. The wireless base station apparatus according to claim 1, wherein the power calculation unit is configured to set, as the second parameter, the smaller value of a difference between second target power and the first parameter and the first maximum value when detecting that the reception power of the signal transmitted from the another terminal equipment is less than the predetermined value, and further set a difference between the second target power and the first maximum value as the first parameter and the first maximum value as the second parameter when the first parameter is adjusted.

4. The wireless base station apparatus according to claim 3, wherein when detecting that the reception power of the signal transmitted from the another terminal equipment is less than the predetermined value, the power calculation unit is configured to set, as the first parameter, a value obtained by subtracting a second offset value from a difference between the second target power and the first maximum value and set, as the second parameter, a sum of the first minimum value and the second offset value when the second offset value is set on the basis of a time variation of the reception power of the signal transmitted from the another terminal equipment and the first parameter is adjusted.

5. A communication method for a wireless base station apparatus to establish a wireless connection with terminal equipment, the communication method comprising:
   detecting an intensity of a signal transmitted from another terminal equipment other than the terminal equipment;
   setting the larger value of a first minimum value and a difference between first target power and a first parameter adjusted at an interval of predetermined time as a second parameter taking a value between the first minimum value and a predetermined first maximum value when detecting that reception power of a signal transmitted from the another terminal equipment is equal to or larger than a predetermined value, and further setting a difference between the first target power and the first minimum value as the first parameter and the first minimum value as the second parameter when the first parameter is adjusted; and
   calculating a sum of the first parameter and the second parameter as transmission power to the terminal equipment.

* * * * *

UNITED STATES PATENT AND TRADEMARK OFFICE
CERTIFICATE OF CORRECTION

PATENT NO.       : 9,179,422 B2
APPLICATION NO.  : 14/640660
DATED            : November 3, 2015
INVENTOR(S)      : Otonari et al.

It is certified that error appears in the above-identified patent and that said Letters Patent is hereby corrected as shown below:

In the Claims,

Column 16, line 39-Column 18, line 23, delete claims 1-5 and substitute the following claims 1-5.

1. A wireless base station apparatus to establish a wireless connection with terminal equipment, the wireless base station apparatus comprising:
 a detection unit configured to detect an intensity of a signal transmitted from another terminal equipment other than the terminal equipment; and
 a power calculation unit configured to calculate, as transmission power for the terminal equipment, a sum of a first parameter adjusted at an interval of predetermined time and a second parameter taking a value between a predetermined first minimum value and a predetermined first maximum value,
 wherein the power calculation unit is configured to set, as the second parameter, the larger value of the first minimum value and a difference between first target power and the first parameter when detecting that reception power of the signal transmitted from the another terminal equipment is equal to or larger than a predetermined value, and further set a difference between the first target power and the first minimum value as the first parameter and the first minimum value as the second parameter when the first parameter is adjusted.

2. The wireless base station apparatus according to claim 1,
wherein when detecting that the reception power of the signal transmitted from the another terminal equipment is equal to or larger than the predetermined value, the Signed and Sealed this
Fifth Day of July, 2016

Michelle K. Lee
*Director of the United States Patent and Trademark Office* power calculation unit is configured to set, as the first parameter, a value obtained by adding a first offset value to a difference between the first target power and the first maximum value and set, as the second parameter, a difference between the first maximum value and the first offset value when the first offset value is set on the basis of a time variation of the reception power of the signal transmitted from the another terminal equipment and the first parameter is adjusted.

3. The wireless base station apparatus according to claim 1, wherein the power calculation unit is configured to set, as the second parameter, the smaller value of a difference between second target power and the first parameter and the first maximum value when detecting that the reception power of the signal transmitted from the another terminal equipment is less than the predetermined value, and further set a difference between the second target power and the first maximum value as the first parameter and the first maximum value as the second parameter when the first parameter is adjusted.

4. The wireless base station apparatus according to claim 3, wherein when detecting that the reception power of the signal transmitted from the another terminal equipment is less than the predetermined value, the power calculation unit is configured to set, as the first parameter, a value obtained by subtracting a second offset value from a difference between the second target power and the first minimum value and set, as the second parameter, a sum of the first minimum value and the second offset value when the second offset value is set on the basis of a time variation of the reception power of the signal transmitted from the another terminal equipment and the first parameter is adjusted.

5. A communication method for a wireless base station apparatus to establish a wireless connection with terminal equipment, the communication method comprising:
    detecting an intensity of a signal transmitted from another terminal equipment other than the terminal equipment;
    setting the larger value of a first minimum value and a difference between first target power and a first parameter adjusted at an interval of predetermined time as a second parameter taking a value between the first minimum value and a predetermined the another terminal equipment is equal to or larger than a predetermined value, and further setting a difference between the first target power and the first minimum value as the first parameter and the first minimum value as the second parameter when the first parameter is adjusted; and calculating a sum of the first parameter and the second parameter as transmission power to the terminal equipment.